United States Patent [19]
Walker

[11] 3,802,086
[45] Apr. 9, 1974

[54] NON-CONTACT GAGING MEANS AND MACHINE USING SAME

[75] Inventor: John H. Walker, Kettering, Ohio

[73] Assignee: The Bendix Corporation, Southfield, Mich.

[22] Filed: Sept. 5, 1972

[21] Appl. No.: 286,097

Related U.S. Application Data

[63] Continuation of Ser. No. 37,229, May 14, 1970.

[52] U.S. Cl.............. 33/174 R, 33/174 P, 33/174 L, 33/DIG. 2, 308/DIG. 1
[51] Int. Cl. .............................................. G01b 5/20
[58] Field of Search.......... 33/174 R, 174 P, 174 L, 33/DIG. 2; 308/DIG. 1

[56] References Cited
UNITED STATES PATENTS

| | | | |
|---|---|---|---|
| 3,321,838 | 5/1967 | Albertson, Jr. | 33/174 |
| 3,169,807 | 2/1965 | Abel et al. | 308/DIG. 1 UX |
| 3,578,746 | 5/1971 | Walker | 33/174 |
| 3,250,012 | 5/1966 | Hilton et al. | 33/174 |
| 3,194,055 | 7/1965 | Knobel | 73/37.5 |
| 3,384,970 | 5/1968 | Aualear | 33/189 |
| 3,245,334 | 4/1966 | Long | 308/DIG. 1 UX |

FOREIGN PATENTS OR APPLICATIONS

| | | | |
|---|---|---|---|
| 23,324 | 7/1949 | Finland | 33/DIG. 2 |
| 1,204,750 | 8/1959 | France | 33/DIG. 2 |

Primary Examiner—John W. Huckert
Assistant Examiner—Milton Gerstein
Attorney, Agent, or Firm—John R. Benefiel

[57] ABSTRACT

A non-contact gaging apparatus, and a measuring machine using same, is provided wherein such apparatus has a housing adapted to be supported adjacent a workpiece which is to be measured. A movable member is supported within the housing for substantially frictionless rectilinear movement toward and away from the workpiece with the member being yieldingly urged outwardly toward the workpiece with a precisely controlled constant force. A fluid jet is provided and acts between the member and the workpiece to partially override the outward urging means and hold the member a precise distance from the workpiece. An electrical device is provided having component portions thereof fixed on the member and other cooperating component portions fixed on the housing without contacting the component portions on the member and such electrical device provides precision electrical output signals based on the relative positions of its component portions whereby with the member being held a precise distance from the workpiece by the fluid jet the electrical output signals may be considered gaging signals representing corresponding dimensions of the workpiece.

21 Claims, 4 Drawing Figures

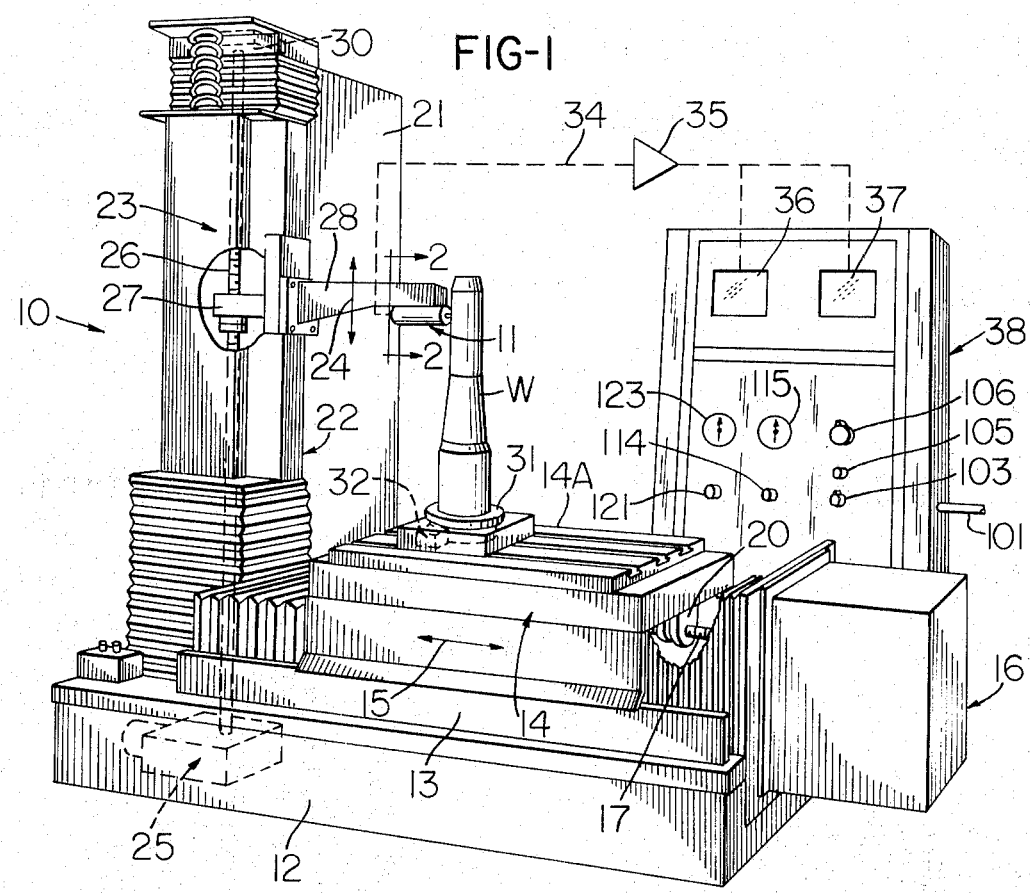

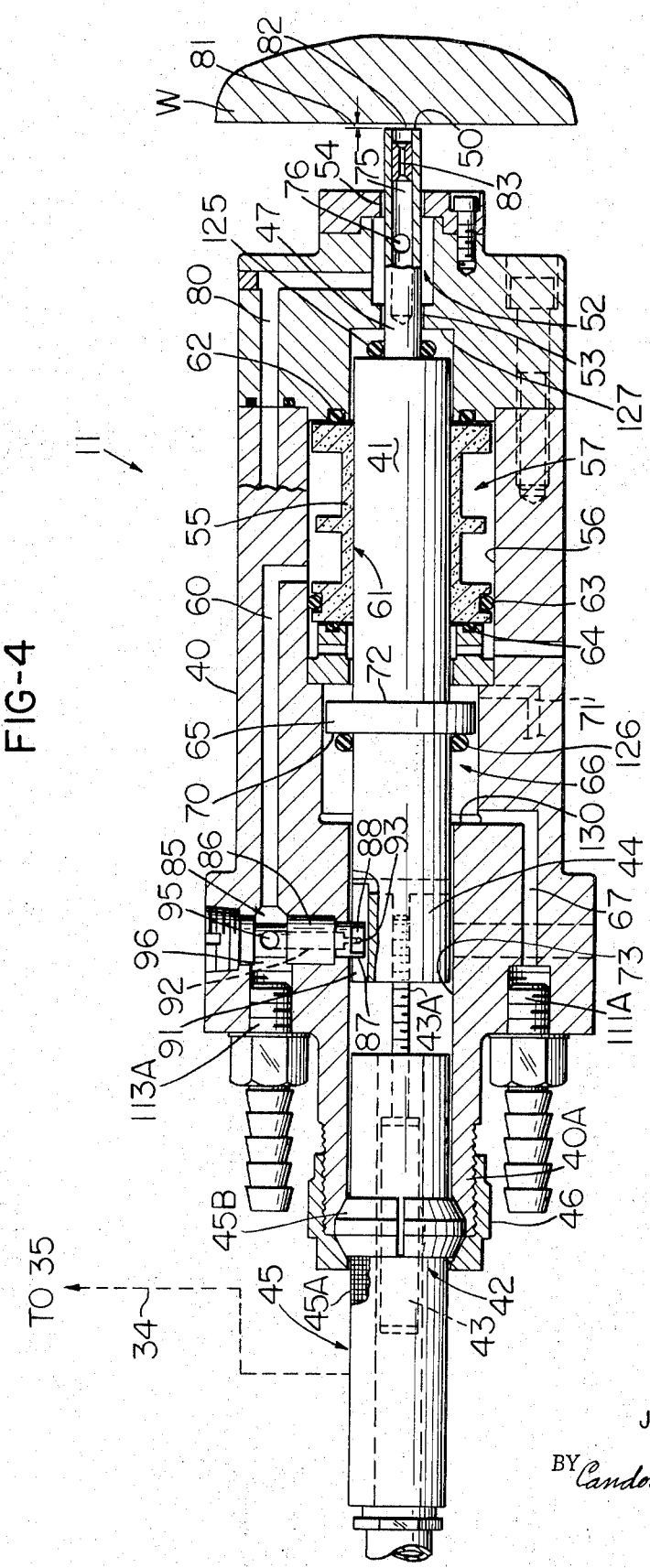

NON-CONTACT GAGING MEANS AND MACHINE USING SAME

This is a continuation of U.S. Pat. application Ser. No. 37,229, filed May 14, 1970.

BACKGROUND OF THE INVENTION

There are numerous commercial products which because of their unique characteristics must be measured to determine their dimensional sizes without actually contacting such products. Non-contact gaging devices proposed heretofore are generally very expensive, have limited measuring ranges (such as 0.006 inch, for example), and provide poor measuring accuracies whereby these previously proposed devices are generally unacceptable.

SUMMARY

This invention provides an improved non-contact gaging apparatus and an improved measuring machine using same, wherein the gaging apparatus is of simple and economical construction, has a measuring range of roughly 0.100 inch, and provides measurements to an accuracy of approximately $\pm 25/1,000,000,000$ of an inch over the full measuring range. The apparatus has a housing which is adapted to be supported adjacent a workpiece which is to be measured and a movable member is supported within the housing for substantially frictionless rectilinear movement toward and away from the workpiece with the member being yieldingly urged outwardly toward the workpiece with a precisely controlled constant force. A fluid jet is ejected from the member and acts between the member and the workpiece to partially override the outward urging and thereby hold the member a precise distance from the workpiece. The apparatus comprises an electrical device having component portions thereof fixed on the member and other cooperating component portions fixed on the housing without contacting the component portions on the member and such electrical device provides precision electrical output signals based on the relative positions of its component portions whereby with the member being held a precise distance from the workpiece by the fluid jet the electrical output signals are in essence gaging signals representing corresponding dimensions of the workpiece.

Other details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention, in which FIG. 1 is a perspective view, with parts broken away and other parts shown schematically, of an exemplary measuring machine which includes a non-contact gaging apparatus of this invention;

FIG. 2 is an enlarged view taken on the line 2—2 of FIG. 1, showing the rear portion of a gaging device in the form of an electropneumatic transducer used on the machine of FIG. 1;

FIG. 3 is a schematic view illustrating the fluid and electrical systems used with the device of FIG. 2, and FIG. 4 is a greatly enlarged cross-sectional view of an exemplary gaging device of this invention.

DESCRIPTION OF ILLUSTRATED EMBODIMENT

Reference is now made to FIG. 1 of the drawings, which illustrates an exemplary measuring machine which utilizes one exemplary embodiment of the gaging apparatus of this invention and such gaging apparatus includes a device in the form of an electropneumatic transducer which is designated generally by the reference numeral 11 and will be described in detail subsequently.

The machine 10 has a base 12 provided with horizontal ways 13 which support a worktable assembly 14, which includes a worktable 14A, for reciprocating horizontal movement as indicated by the double arrow at 15 and has a motor and gear box assembly 16 which is supported on the base 12 and drives a drive screw 17 which is threadedly received within a threaded projection 20 fixed to the assembly 14. The motor of the assembly 16 rotates the drive screw 17 in one direction to move the worktable 14A in a corresponding direction on ways 13 and rotates the screw 17 in an opposite direction to move the worktable in an opposite direction on ways 13.

The measuring machine 10 also has a vertically extending structural portion 21 supported on the base 12 and portion 21 has vertical ways 22 which support a carriage 23 for vertical sliding movement as indicated by the double arrow at 24. The machine 10 has another motor and gear box assembly 25 which is supported on the base 12 and is suitably operatively connected to a drive screw 26 which is threadedly received within a threaded projection 27 extending rearwardly from the carriage 23; and, the drive screw 26 has a smooth upper portion which is suitably supported in an anti-friction bearing assembly 30. Thus, upon rotating the motor of the assembly 25 to rotate the drive screw 26 in one direction the carriage 23 is moved in a corresponding direction on vertical ways 22 and upon rotating the motor to drive the screw 26 in an opposite direction the carriage 23 is moved in an opposite direction.

The carriage 23 also has a suitable support in the form of a horizontally extending supporting arm 28 which is fixed thereto in any suitable manner so that upon moving the carriage 23 vertically upwardly or downwardly the support 28 is also moved therewith. The gaging device 11 is attached in a fixed manner adjacent the terminal end portion of the support 28 and thus moves with the support 28 and carriage 23.

The exemplary machine 10 also has a rotatable support or rotary table 31 which is suitably fastened on the worktable 14 and is provided with a drive 32 for rotating the rotary table 31 in either a clockwise of counterclockwise manner and for a purpose which will be apparent from the subsequent description. The machine 10 is popularly referred to as a two-axis measuring machine and in normal operation thereof the rotary table 31 is suitably attached on the worktable 14 and a workpiece W which is to be dimensionally measured is attached on the rotary table either directly or by using a suitable fixture. By moving the worktable 14, carriage 23, and rotary table 31, it is readily possible to move the device 11 in operative association with exemplary workpiece W and obtain precise dimensional measurements along its full vertical height and over its entire outer surface.

The device 11 is provided with suitable electrical means, to be described subsequently, and provides electrical signals therefrom (which will be referred to as gaging signals) through a dotted line indicated at 34 to an electrical amplifier 35. The signals are amplified and suitably modified in the amplifier 35 to enable visual display thereof as a dimensional measurement on a visual indicator or gage 36 and such signals may also be recorded on a permanent recorder 37 which may be of any suitable known construction. The indicator 36 and permanent recorder are mounted on a control console 38 comprising the machine 10.

The electropneumatic transducer or device 11 comprises housing means such as a housing 40, see FIG. 4, which in this example is fixed adjacent the terminal end of the horizontal supporting arm 28 and a movable member 41 is provided and supported within the housing for substantially frictionless movement toward and away from the workpiece W with the device arranged in a normal gaging position. The member 41 is preferably in the form of an elongated rod-like member which may be made from a single piece of material or made as an integral single piece unit by suitably fixing together a plurality of its component portions.

The exemplary device 11 utilizes a precision linear variable differential transformer indicated generally 42, to provide precision electrical gaging signals therefrom and because such a transformer is known in the art, it will be described only briefly. The transformer 42 has first electrical means in the form of a core member 43 which is suitably adjustably attached in a fixed manner by a threaded rod 43A to what will be referred to as the rear portion 44 of the member 41, the front or forward portion being cosidered that portion most closely adjacent the workpiece W. The transformer 42 also has second electrical means in the form of a coil assembly or coil 45 having electrical windings 45A provided as an integral part thereof and assembly 45 is held firmly in position by a split ring 45B and a threaded nut 46 which is threaded onto an externally threaded rear portion 40A of the housing 40 whereby coil assembly 45 is axially adjustable.

The coil assembly 45 operatively associates with the core 43 of the differential transformer 42 in a noncontacting manner to provide precision electrical gaging signals from the coil 45 based on the relative positions of the core 43 and coil 45. In particular, inasmuch as the coil 45 is held in a fixed position, electrical signals provided through the line 34 depend upon the various positions of the core 43 within the coil 45. Further, because the core member or armature 43 is fixed to the axially movable member 41 the precision signals provided from the coil 45 represent axial positions of the movable member 41 within its housing 40 and as will be apparent subsequently such axial positions are precisely directly related to corresponding dimensions of the workpiece W.

The movable member 41 has a forward portion 47 which is provided with a terminal front surface which in this example is defined by an annular planar surface 50; and, the forward portion 47 has a cross-sectional area which is smaller than the cross-sectional area of the central portion of the member 41 and has a circular cross-sectional outline.

The housing 40 of the device 11 has a fluid chamber in the form of a substantially cylindrical chamber 52 formed in the housing 40 by any suitable technique and the chamber 52 has a diameter which is substantially larger than the diameter of the forward portion 47. The forward portion 47 extends through the chamber 52 and through aligned cylindrical openings 53 and 54 provided in the housing 40 and communicating with opposite sides of the chamber 52 and the diameter of the cylindrical openings 53 and 54 is closely controlled to assure that the forward portion 47 may reciprocate therethrough without contacting the housing 40, and for reasons which will be apparent subsequently in this specification.

The member 41 is supported within the housing 40 for substantially frictionless movement by a sleeve-like member 55 made of porous graphite and member 55 is suitably fixed within the housing 40. The member 55 is received within a central bore 56 in housing 40 having a comparatively large diameter; and, the bore 56 defines a fluid bearing pressure chamber designated by the reference numeral 57.

Any suitable fluid, such as air under pressure, is provided through a passage 60 in housing 40 to the pressure chamber 57 and such air flows through the porous graphite member 55 to provide a substantially frictionless cylindrical air bearing, indicated at 61, between the outside cylindrical surface of the central portion of the member 41 and the inside cylindrical surface of the member 55 to thereby enable substantially frictionless reciprocating axial movement of member 41 within its housing 40. Suitable O-ring seals 62, 63, and 64 may be provided around the sleeve member 55 to assure the provision of air bearing 61.

The device 11 also has means yieldingly urging the member 41 forwardly and toward the workpiece W; and, although any suitable urging means (such as a mechanical spring having a negligible spring rate) may be provided for this purpose, such urging means preferably uses a fluid, such as air, under a precisely controlled pressure to assure that the member 41 is urged forwardly with an unvarying controlled force. The urging means of this example comprises a piston 65 fixed to the central portion of the member 41 and such piston is received within a piston chamber 66 formed in the housing 40 by a substantially cylindrical bore provided therein.

First conduit means is provided and includes a passage 67 which communicates with the rear portion of the piston chamber 66 so as to apply a controlled pressure against the rear surface 70 of the piston 65 and thereby yieldingly urge the member 41 forwardly toward the workpiece W with a precisely controlled force. Second conduit means is also provided and includes a passage 71 provided in the housing 40 which communicates with the forward portion of the piston chamber to apply pressure on the forward face 72 of the piston 65 and thereby provide rearward movement thereof and hence automatic retraction of the member 41 within housing 40.

The rear portion 44 of the member 41 has an outside diameter which is closely controlled with respect to the inside diameter of a bore 73 provided in the rear portion of the housing 40 to assure that there will be no obstruction of the rear portion of elongated member 41 as it reciprocates within the housing 40 and, from the previous description, it is apparent that forward portion 47 can move through aligned bores 53 and 54 in an unobstructed manner. Thus, support for elongated member 41 is provided solely by the air bearing 61 provided between the graphite sleeve member 55 whereby member 41 is easily moved in a frictionless floating manner.

The forward portion 47 of member 41 has a passage in the form of a cylindrical bore 75 extending inwardly from its planar surface 50 and opening means in the form of transverse passages or openings 76 are provided in member 41 and extend from the outside surface of forward portion 47 inwardly in flow communication with the bore 75. The bore 75 and transverse passages 76 are arranged so that with full movement of member 41 from its innermost position to its outermost position the transverse passages 76 will be in fluid flow communication with the chamber 52.

The chamber 52 is provided with fluid which, in this example, is in the form of a gas such as air, through an internal passage 80 in the housing 40. Air from the chamber 52 flows through the transverse passages 76 and through the passage 75 so that it acts between the member 41 and the workpiece W to partially override the urging means or the outward urging of member 41 as provided by air acting against the surface 70 of piston 65 so as to hold the member 41 a precise distance from the workpiece W as indicated at 81.

The air passage 75 flows outwardly in a jet which for convenience will be designated by the reference numeral 82 and impinges against the workpiece W to provide the precisely controlled distance 81 between the workpiece W and the terminal end of the member 41. Further, it will be appreciated that the distance 81 may be precisely controlled by controlling the pressure in the chamber 52 and hence the velocity of jet 82 as well as precisely controlling the pressure in the piston chamber 66. Thus, irrespective of the condition of the outside surface of the workpiece W, provided that such outside surface remains substantially uniform throughout, a precise dimensional measurement can be obtained without contacting such workpiece and in a manner heretofore not possible utilizing conventional apparatus and methods.

To provide a more precise control of the energy of the jet 82, a restrictor 83 may be provided in the passage 75 and such restrictor may have a fixed configuration or may be an adjustable or variable restrictor which may be adjusted as required by the particular conditions in any given gaging application.

To assure the differential transformer 42 provides precision results, substantially frictionless means is provided to prevent rotation of the member 41 during reciprocating movement thereof; and, in this example of the invention such means comprises a key assembly 85. The key assembly 85 has a rod-like member 86 which includes a key 87 at its lower end which is provided with a pair of opposed parallel surfaces 88. The key 87 is received within a keyway 91 of substantially rectangular cross-sectional outline provided in the rear portion 44 of member 41.

The member 86 has a vertical passage 92 provided therein which communicates with a transverse passage 93 at its terminal lower end and the opposed ends of the transverse passage 93 exit the opposed parallel surfaces 88 of the key 87.

Means is also provided for supplying a fluid, air in this example, to the vertical passage 92 and such supplying means includes a transverse passage 95 provided in member 86 adjacent the upper end thereof. Passage 95 communicates with a chamber 96 provided in the housing 40 and the chamber 96 is supplied with air in a manner to be subsequently described. The chamber 96 communicates with the internal passage 60 to the air bearing chamber 57 whereby the air under pressure which is supplied to the air bearing chamber 57 is also supplied through passage 92 and exits the opposed ends of passage 93 in opposed streams impinging against parallel surfaces defining opposite sides of the keyway 91. Thus, air bearing means is provided between the key 87 and the keyway 91 to assure that member 41 is free to reciprocate within housing 40 without any drag even from the key 87.

Although air bearings are provided on opposed surfaces of key 87 to assure frictionless reciprocating movements of member 41, it will be appreciated that the amount of drag imposed by such a key is comparatively small and in some applications of this invention a simple mechanical key and keyway may be provided with cooperating surfaces being suitably coated with antifriction materials, such as teflon or a suitable lubricant, for example.

Reference is now made to FIG. 3 of the drawings which schematically illustrates the fluid system which supplies fluid, air in this example of the invention, to the device 11. In particular, it will be seen that air under regulated pressure is supplied from any suitable source, such as an air compressor, through a conduit 101 which has a pressure regulator 102 installed therein and which may be provided with a shut-off valve 103 in the line 101.

A conduit 104 is connected in fluid flow communication with the conduit 101 and a precision air pressure regulator 105 is installed in the line 104. The regulator 105 in this example precisely controls air pressure to a value of approximately 0.1 psig.

A selector valve 106 is installed in the line 104 downstream of the pressure regulator 105 and the valve 106 has an inlet 109 and a pair of outlets 107 and 108 which are arranged in fluid flow communication with a first conduit 111 and a second conduit 112 respectively. The conduits 111 and 112 have connectors 111A and 112A at their discharge ends connecting such conduits with passages 67 and 71 respectively (see FIG. 4) provided in housing 40 whereby upon providing air to the rear end of piston chamber 66 through conduit 111 and passage 67 member 41 is extended and upon providing air to the forward end of the piston chamber 66 through conduit 112 and passage 71 member 41 is retracted.

Another conduit 113 is provided in fluid flow communication with the conduit 101 and has a pressure regulator 114 installed therein. The conduit 113 also has a pressure gage 115 suitably connected thereto by a line 116 and the discharge end of conduit 113 has a threaded connector 113A which connects such conduit with a cooperating threaded member on housing 40 and in fluid flow communication with the chamber 96 which in turn communicates with passage 60. The pressure gage 115 is mounted on the control console 38 and provides a visual indication of the pressure of the air supplied to the passage 60. From the above it is seen that air under regulated pressure is supplied through the conduit 113 and through passage 60 to the air bearing chamber 57 in the housing 40 and the pressure within such chamber is accurately controlled by the pressure regulator 114 to assure that the air bearing provided at 61 enables frictionless reciprocating movements of the member 41.

Another conduit 120 is connected in fluid flow communication with the conduit 101 and has another pressure regulator 121 installed therein. A line 122 is also connected to conduit 120 downstream of the pressure regulator 121 and has an air pressure gage 123 installed therein with gage 123 being mounted on the control console or panel 38. The conduit 120 has a suitable threaded connector 120A at its discharge end which is threadedly connected to a cooperating connecting portion on housing 40 whereby conduit 120A is placed in fluid flow communication with passage 80 in housing 40, see FIGS. 2 and 4. Thus, it is seen that air under precisely controlled pressure is provided in chamber 52 to assure that the jet 82 ejecting against the workpiece W operates to move the member 41 a precisely controlled distance away from the workpiece W and thereby provide a precisely adjustable "stand-off" of the planar surface 50 from the outside surface of the workpiece W in the manner previously mentioned.

Having described the detailed components of the machine 10 and the gaging apparatus of this invention, a brief general description will now be made to highlight the simplicity with which a workpiece, such as the workpiece W, may be precisely measured in a non-contacting manner to an accuracy of plus or minus 25 × $10^{-6}$ inch consistently and over a gaging range of approximately 0.100 inch. In particular, suitable control means may be provided to actuate the motor in the assembly 16 to thereby move worktable 14A and the rotary table 31 carried thereon to a predetermined position with respect to the device 11. This movement may be achieved manually or the machine 10 may be in the form of a numerically controlled machine wherein movement of the worktable assembly 14 and hence worktable 14A is provided by a programmed input to the motor and gear box assembly 16 from any suitable means such as, a punched card, punched tape, magnetic tape, etc.

With the worktable 14A thus precisely positioned the gaging device 11 is supplied with air to its various connectors and the member 41 is urged outwardly by air provided against rear surface 70 of piston 65 and simultaneously the jet 82 of air ejects from passage 75 against the workpiece W so that the member 41 floats back in a frictionless manner on its air bearing 61 causing the planar annular surface 50 to "stand-off," i.e., be moved and held away, from the outer surface of the workpiece W by a precisely controlled distance such as 0.002 inch, for example, whereby the device 11 may now be considered in operative association with the workpiece W. However, it is to be understood that the amount of "stand-off" may be precisely controlled from 0.001 to 0.006 inch or more, depending upon jet configuration and pressure values chosen.

With the device 11 in operative association with the workpiece W, the rotary drive 32 for the rotary table 31 may be energized and the outside circumference of the workpiece W may be checked for any out-of-round condition at any horizontal plane along its vertical height with any out-of-round condition being visually displayed on the visual gage 36 and automatically recorded on the recorder 37. In particular, as the rotary table 31 rotates the workpiece W, the member 41 will follow, i.e., track, the outside surface of the workpiece W, maintaining the member 41 a constant 0.002 inch distance therefrom at all times. Any irregularity or out-of-round condition will result in movement of the member 41 and hence displacement of the core 43 with respect to the windings 45 of the precision differential transformer 42 to provide a corresponding electrical output signal which is amplified in amplifier 35 and displayed on gage 36 while being recorded on the permanent recorder 37.

It will also be appreciated that the supporting arm 28 may be moved vertically by moving its carriage 23 in the manner previously described to thereby check the deviation of the outside surface of the workpiece W along its full height or along any designated portion thereof from a reference vertical plane. During movement of the supporting arm 28, the member 41 is held at its precisely controlled "stand-off" condition by the cooperating action of the urging means urging the member 41 outwardly and the air jet 82 whereby any movement of member 41 relative to housing 40 during vertical movement of arm 28 will be indicated on the visual gage 36 and recorder 37 in a similar manner as explained earlier. It will also be appreciated that the vertical movement of carriage 23 on vertical ways 22 and hence movement of the supporting arm 28 and device 11 may be controlled by either manual or automatic means in a similar manner as previously described in connection with the control of the worktable assembly 14 on the horizontal ways 13.

At the completion of any particular measuring cycle, the member 41 may be automatically retracted simply by operating the selector valve 106 so as to divert air flow therethrough from its outlet 107 to its outlet 108.

Further, to assure that the member 41 is not damaged by being forcefully impacted against housing 40 opposed seals 125 and 126 may be provided and seals 125 and 126 serve to cushion the member 41 as it is urged toward surfaces 127 and 130 respectively.

The apparatus of this invention enables precision measurements to be achieved without actually contacting the outside surface of the workpiece and such precision measurements are provided irrespective of actual surface conditions of the workpiece W as long as such surface conditions are substantially uniform and irrespective of whether the outside surface is smooth, rough, or porous. Further, the apparatus of this invention may be suitably adjusted to assure the desired "stand-off" is within the center of the operating range of the non-contact electrical device (such as device 42) comprising the apparatus of this invention whereby precision results may be assured. In addition, this adjustment capability enables easy set up of the apparatus using a known standard and thereby assures that the gaging signals are precise within desired limits.

In this example of the invention, electrical power supplies and connections have not been shown for the differential transformer 42, the amplifier 35, the various motor and gear box assemblies, the drive for the rotary table 31, etc. However, it will be appreciated that suitable power supplies and connections are provided for these components using any suitable technique known in the art.

In this disclosure of the invention air has been used as the operating fluid and such air associates with the device 11. However, it is to be understood that any suitable fluid may be used and such fluid may be either a liquid or a gas. In case of a liquid, the fluid may be a coolant-lubricant which may be ejected against a workpiece W which is being machined by a machine 10, in the form of a cutting machine, to provide both "standoff" and a cooling-lubricating function.

While present exemplary embodiments of this invention, and methods of practicing the same, have been illustrated and described, it will be recognized that this invention may be otherwise variously embodied and practiced within the scope of the following claims.

What is claimed is:

1. A non-contact gaging apparatus comprising, a housing adapted to be supported adjacent a workpiece, a support fixed within said housing and having an inside surface, a movable member arranged within said housing and having an outside surface arranged concentrically within said inside surface, fluid bearing means acting between said inside surface of said support and said outside surface of said movable member and providing the sole means supporting said movable member within said housing for substantially frictionless movement toward and away from said workpiece, said fluid bearing means comprising means flowing a bearing fluid transverse the inside surface of said support and in a simultaneous manner substantially normally against said outside surface of said movable member at spaced locations about its periphery, said member having first electrical means thereon, means yieldingly urging said member toward said workpiece, fluid means acting between said member and said workpiece to partially override said urging means and hold said member a precise distance from said workpiece, means for supplying a fluid under pressure to said fluid beaing means and to said fluid means, and second electrical means fixed to said housing and operatively associating with said first electrical means in a non-contacting manner to provide precision electrical gaging signals therefrom based on the relative positions of said electrical means so that upon relatively moving said housing and workpiece said member is held said precise distance from said workpiece by said fluid means acting between said member and workpiece and electrical gaging signals provided by said electrical means during the relative movement represent corresponding dimensions of said workpiece.

2. An apparatus as set forth in claim 1 in which said fluid bearing means is in the form of air bearing means.

3. An apparatus as set forth in claim 1 in which said member has a terminal surface and a passage therethrough which is arranged transverse to and exits said terminal surface, a fluid chamber in said housing provided with a fluid at a controlled pressure by said means for supplying a fluid under pressure, and opening means in said member placing said passage in fluid flow communication with said chamber enabling said fluid in said chamber to flow from said passage as a jet which impinges said workpiece to hold said member said precise distance, said chamber and opening means assuring the provision of said jet yet allowing unrestrained movement of said member.

4. An apparatus as set forth in claim 3 in which said member comprises an elongated member which is supported for substantially axial movement, said terminal surface comprises a substantially planar surface, said passage comrpises a bore extending from said planar surface inwardly, and said opening means comprises at least one opening extending from the exterior surface of said member inwardly in fluid flow communication with said bore with said opening means remaining in flow communication with said fluid chamber over the full operating range of said elongated member.

5. An apparatus as set forth in claim 4 and further comprising a restrictor fixed in said passage to control the energy of said jet in a precise manner.

6. An apparatus as set forth in claim 3 in which said first electrical means comprises a core of a precision differential electrical transformer fixed on said member and said second electrical means comprises electrical windings of said differential transformer which are fixed on said housing as an annular assembly through which said core moves in a non-contacting manner and provides a different electrical signal for each position thereof relative to said windings.

7. An apparatus as set forth in claim 1 in which said urging means comprises fluid means urging said member with a precisely controlled force.

8. An apparatus as set forth in claim 7 in which said fluid means comprises air under regulated pressure.

9. An apparatus as set forth in claim 1 in which said member comprises an elongated member supported in said housing for longitudinal movement and having a piston fixed thereon, said piston having a rear surface and a forward face, said housing has a piston chamber for receiving said piston, and said urging means comprises first conduit means supplying fluid at a controlled pressure against said rear surface of said piston to yieldingly urge said member toward said workpiece with a precisely controlled force.

10. An apparatus as set forth in claim 9 and further comprising second conduit means supplying fluid to said forward face of said piston to provide automatic retraction thereof and of said elongated member.

11. An apparatus as set forth in claim 10 and further comprising a supply of fluid under regulated pressure, a selector valve having an inlet in fluid flow communication with said supply and having a pair of outlets, one of said outlets communicating with said first conduit means and the other of said outlets communicating with said second conduit means, said selector valve enabling using a common supply of fluid as a part of said urging means and to enable said automatic retraction.

12. In combination: a measuring machine having a worktable for supporting a workpiece and having support means arranged adjacent said workpiece and a non-contact gaging apparatus, said gaging apparatus comprising, a housing fixed on said support means, an air chamber in said housing provided with air at a controlled pressure, a support fixed within said housing and having an inside surface, an elongated movable member arranged within said housing and having an outside surface arranged concentrically within said inside surface, fluid bearing means acting between said inside surface of said support and said outside surface of said movable member and providing the sole means supporting said movable member within said housing for substantially frictionless axial movement toward and away from said workpiece, said fluid bearing means comprising means flowing a bearing fluid transverse the inside surface of said support and in a simultaneous manner substantially normally against said outside surface of said movable member at spaced locations about its periphery, said member having first electrical means thereon, means yieldingly urging said member toward said workpiece, said member having a planar terminal outside surface and a passage through said member which is arranged perpendicular to and exits said terminal surface, said member having opening means therein placing said passage in fluid flow communication with said air chamber enabling air to flow from said passage as a jet which impinges said workpiece to partially override said urging means and hold said member a precise distance from said workpiece, means for relatively moving said housing and workpiece, means for supplying a fluid under pressure to said fluid bearing means, and second electrical means fixed to said housing and operatively associating with said first electrical means in a non-contacting manner to provide precision electrical gaging signals therefrom based on the relative positions of said electrical means so that upon relatively moving said housing and workpiece said member is held said precise distance from said workpiece by said air jet acting between said member and workpiece and electrical gaging signals provided by said electrical means during the relative movement represent corresponding dimensions of said workpiece.

13. A combination as set forth in claim 12 in which said fluid bearing means is in the form of air bearing means.

14. A combination as set forth in claim 12 in which said first electrical means comprises a core of a precision differential electrical transformer fixed on said member and said second electrical means comprises electrical windings of said differential transformer which are fixed on said housing as an annular assembly through which said core moves in a non-contacting manner and provides a different electrical signal for each position thereof relative to said windings.

15. A combination as set forth in claim 15 in which said urging means comprises air operated means urging said member with a precisely controlled force.

16. A non-contact electropneumatic gaging device comprising, a housing adapted to be supported adjacent a workpiece, a support fixed within said housing and having an inside surface, a movable member arranged within said housing and having an outside surface arranged concentricaly within said inside surface, fluid bearing means acting between said inside surface of said support and said outside surface of said movable member and providing the sole means supporting said movable member within said housing for substantially frictionless movement toward and away from said workpiece, said fluid bearing means comrpising means flowing a bearing fluid transverse the inside surface of said support and in a simultaneous manner substantially normally against said outside surface of said movable member at spaced locations about its periphery, said member having first electrical means thereon, means for yieldingly urging said member toward said workpiece, means enabling air to act between said member and said workpiece to enable partial overriding of said urging means and thereby hold said member a precise distance from said workpiece, means for supplying a fluid under pressure to said fluid bearing means, and second electrical means fixed to said housing and operatively associating with said first electrical means in a non-contacting manner to provide precision electrical gaging signals therefrom based on the relative positions of said electrical means so that upon relatively moving said housing and workpiece said member is held said precise distance from said workpiece by said means enabling air to act between said member and said workpiece and electrical gaging signals provided by said electrical means during the relative movement represent corresponding dimensions of said workpiece.

17. A device as set forth in claim 17 in which said movable member comprises an elongated member having a circular cross-sectional outline at any position along the length thereof and said support comprises a sleevelike member having comparatively large diameter flanges defining its opposite ends, said sleeve-like member being made of a porous material and being supported within a bore of said housing having a diameter corresponding to the diameter of said flanges, said bore defining an air bearing pressure chamber, said means for supplying a fluid under pressure comprising means for supplying air under pressure to said pressure chamber to cause flow through said porous sleeve-like member and transverse its inside surface and define said fluid bearing means in the form of an air bearing acting between said sleeve-like member and said elongated member to provide said substantially frictionless movement.

18. A device as set forth in claim 18 in which said means enabling air to act between said member and said workpiece comprises, a planar terminal surface on said member, a passage extending through the forward end portion of said member and exiting said terminal surface, a second chamber in said housing adapted to be provided with air at a controlled pressure, and opening means in said member placing said passage in fluid flow communication with said second chamber enabling air supplied to said second chamber to flow from said passage as a jet which impinges said workpiece to hold said member said precise distance, said second chamber and opening means assuring the provision of said jet yet allowing unobstructed movement of said member.

19. A device as set forth in claim 17 in which said first electrical means comprises a core of a precision differential electrical transformer fixed on said member, and said second electrical means comprises electrical windings of said differential transformer which are fixed on said housing as an annular assembly through which said core moves in a non-contacting manner and provides a different electrical signal for each position thereof relative to said windings.

20. An apparatus as set forth in claim 1 and further comprising an air bearing key assembly operatively connected between said housing and movable member, said key assembly allowing only relative axial movement of said member and housing yet assuring said movement is substantially frictionless.

21. An apparatus as set forth in claim 21 in which said air bearing key assembly comprises a key fixed to said housing, a keyway provided in said elongated member and being defined by surface means, and means providing an air bearing between said key and said surface means.

* * * * *